United States Patent
Libby et al.

(10) Patent No.: US 12,250,268 B2
(45) Date of Patent: Mar. 11, 2025

(54) ORCHESTRATED NODE REMOVAL TO REDUCE CLUSTER CAPACITY IN A CLUSTERED FILE SYSTEM

(71) Applicant: Dell Products L.P., Round Rock, TX (US)

(72) Inventors: Ryan Libby, Seattle, WA (US); Raymond Ramsden, Seattle, WA (US); Jahanvi Bishnoi, Seattle, WA (US); Steven Soumpholphakdy, Chicago, IL (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/304,051

(22) Filed: Apr. 20, 2023

(65) Prior Publication Data

US 2024/0357006 A1    Oct. 24, 2024

(51) Int. Cl.
*H04L 67/1031* (2022.01)
*H04L 41/0897* (2022.01)
*H04L 67/1008* (2022.01)
*H04L 67/1012* (2022.01)

(52) U.S. Cl.
CPC ...... *H04L 67/1031* (2013.01); *H04L 41/0897* (2022.05); *H04L 67/1008* (2013.01); *H04L 67/1012* (2013.01)

(58) Field of Classification Search
CPC ............ H04L 67/1031; H04L 41/0897; H04L 41/0896; H04L 47/781; H04L 67/10; G06F 9/5077; G06F 9/5083; G06F 9/45558
See application file for complete search history.

(56) References Cited

U.S. PATENT DOCUMENTS

| | | | | |
|---|---|---|---|---|
| 8,260,840 B1* | 9/2012 | Sirota | ............... | G06F 9/5061 725/94 |
| 8,805,978 B1* | 8/2014 | Anthonisamy | ....... | G06F 9/5072 709/208 |
| 10,534,652 B1* | 1/2020 | Dugar | ............... | H04L 41/0823 |
| 2008/0281959 A1* | 11/2008 | Robertson | ........... | H04L 43/0817 709/224 |
| 2014/0149590 A1* | 5/2014 | Mallipeddi | ........... | G06F 9/5061 709/226 |

(Continued)

*Primary Examiner* — Johnny B Aguiar
(74) *Attorney, Agent, or Firm* — Amin, Turocy & Watson, LLP

(57) ABSTRACT

The technology described herein is directed towards automating/orchestrating removal of one or more nodes of a node cluster, including in a cloud computing environment in which nodes in a cluster map to deployed virtual machines. An automated workflow can be started based on user input specifying an amount of capacity to remove, which corresponds to one or more nodes to remove. In a node cluster with associated nodes arranged into pools of nodes, node removal is per node pool. An orchestrated workflow performs pre-validation based on satisfying appropriate removal criteria, followed by data move and node removal jobs, and post-validation to check that removed capacity is generally as specified and that the remaining node layout is appropriate. Data of any removed node is re-protected, such as by restoring data from removed nodes to remaining cluster nodes in a manner that maintains the data with a data protection scheme.

20 Claims, 10 Drawing Sheets

(56) References Cited

U.S. PATENT DOCUMENTS

| | | | |
|---|---|---|---|
| 2015/0281113 A1* | 10/2015 | Siciliano | H04L 43/0817 |
| | | | 709/226 |
| 2019/0188190 A1* | 6/2019 | Kulesza | G06F 16/21 |
| 2021/0109789 A1* | 4/2021 | McWeeney | G06F 9/5022 |
| 2021/0392185 A1* | 12/2021 | Einkauf | G06F 9/5077 |
| 2023/0008011 A1* | 1/2023 | Nair | H04L 47/726 |
| 2023/0176924 A1* | 6/2023 | Kamat | G06F 9/5077 |
| | | | 709/226 |
| 2023/0254127 A1* | 8/2023 | Bernat | H04L 9/0897 |
| | | | 713/171 |
| 2024/0012674 A1* | 1/2024 | Xie | G06F 9/45558 |

* cited by examiner

ORCHESTRATED NODE REMOVAL TO REDUCE CLUSTER CAPACITY IN A CLUSTERED FILE SYSTEM

BACKGROUND

In clustered computing environments, a customer or other user may want to reduce the capacity of a deployed cluster. Example reasons for doing so can include cost savings, or re-planning a capacity footprint based on usage. Doing so manually is possible, however such a process is error prone for a variety of reasons, and provides only limited and generally inflexible capabilities with respect to capacity removal.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards an automated (orchestrated) way to perform removal of nodes from a node cluster. As will be understood and in general, the technology described herein coordinates operational features of the node cluster along with disparate cloud application programming interfaces (APIs), which may be from different cloud providers, and automates them collectively to perform node removal.

In one or more implementations as described herein, the capacity reduction process is managed by an orchestration engine, which triggers various operations and jobs to achieve automated node removal corresponding to reduction in storage capacity. In addition, pre-reduction checks are made to ensure that the sufficient free space is available for the planned node removal, and will not violate any node cluster constraint; post-reduction validation reviews the changes to the cluster to ensure that capacity removal was correctly performed according to what was desired, e.g., by a user.

It should be understood that any of the examples herein are non-limiting. As one example, the technology is described in a cloud platform/node cluster environment, however this is only an example and can be implemented in similar environments, including those not yet implemented. For example, for as-a-service solutions, an orchestration engine executes the automation, while for customer managed deployments, the same process can be orchestrated by leveraging serverless functions in the cloud Thus, any of the embodiments, aspects, concepts, structures, functionalities or examples described herein are non-limiting, and the technology may be used in various ways that provide benefits and advantages in data storage and computing in general.

Reference throughout this specification to "one embodiment," "an embodiment," "one implementation," "an implementation," etc. means that a particular feature, structure, or characteristic described in connection with the embodiment/implementation is included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

Aspects of the subject disclosure will now be described more fully hereinafter with reference to the accompanying drawings in which example components, graphs and/or operations are shown. In the following description, for purposes of explanation, numerous specific details are set forth in order to provide a thorough understanding of the various embodiments. However, the subject disclosure may be embodied in many different forms and should not be construed as limited to the examples set forth herein.

Figure 1:
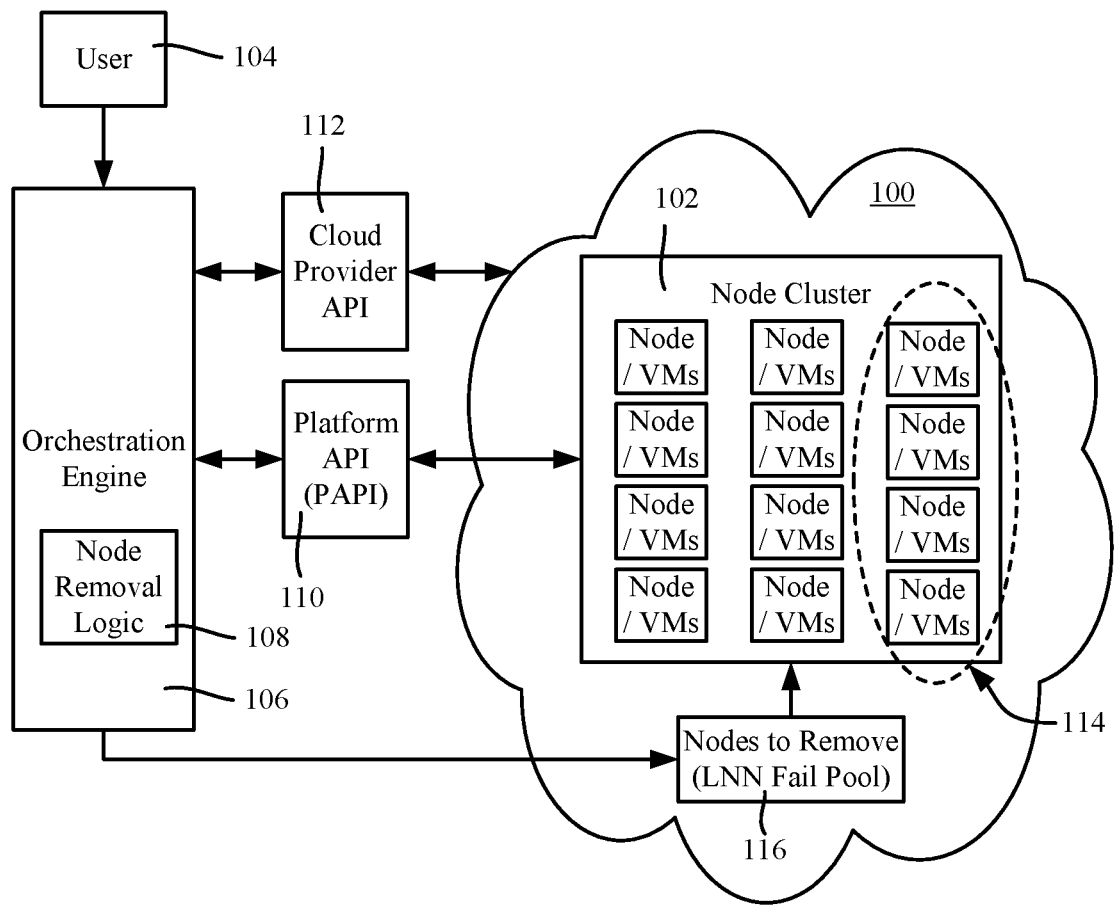
FIG. 1 is a block diagram representation of a system/architecture of a cluster of nodes comprising virtual machines in a cloud environment, coupled to an orchestration component that automates removal of nodes to reduce capacity, in accordance with various aspects and implementations of the subject disclosure.

FIG. 1 shows an example cloud environment 100 hosting a node cluster 102, such as comprising a number of virtual machines (VMs). The nodes store data among the nodes/virtual machines in a distributed file system manner in which the data is protected via a data protection scheme; (twelve nodes are shown in this example, although any practical number may be present). In one implementation, data in a distributed storage system is distributed across storage units of the cluster, along with error-correction information, which ensures that the data remains intact and accessible even in the event of component failures. That is, under normal operating conditions, the data is protected against one or more failures of a node or other hardware. Note that upon planned removal of a node, each VM's data is re-protected, e.g., by intentionally failing the VMs of the node, with data reprotection performed by distributing and rebuilding protected data in the remaining free space of the cluster storage.

The technology described herein thus provides an end-user 104 with the ability to remove some amount of capacity from the deployed node cluster 102. As set forth herein, given the nature of the cloud, customers may choose to remove capacity from their cluster for reasons such as cost or capacity re-planning for their deployment. In general, the user 104 only needs to specify to an orchestration engine 106 a requested amount of capacity to remove/reduce. In an implementation in which nodes are arranged as node pools, the user also provides data identifying from which node pool the capacity is to be removed, wherein in general, a node pool is a group of associated nodes within a cluster that have the same configuration, e.g., groups of disk pools spread across similar, or compatible, storage nodes. Note that there also can be system-defined fault domains within a node pool used in the dynamic data protection scheme; (units of data protection generally do not cross fault domain boundaries). Also note that instead of a user, an automated process or the like can determine (or be run to determine) that capacity should be reduced, and interface with the system as if a user was making the request.

In this example and further examples herein, to remove capacity from a cluster, the user 104 specifies the amount of capacity to reduce. In this example implementation, node removal is described as opposed to anything more granular (e.g., drive removal). Further, in this example, the end-user 104 identifies, via input (e.g., via a suitable user interface) into the orchestration engine 106, a node pool identifier indicating from which pool of nodes the capacity is to be reduced. In an alternative to reducing partial capacity from a particular associated pool of nodes, a user 104 may choose to remove an entire node pool altogether.

Figure 2:
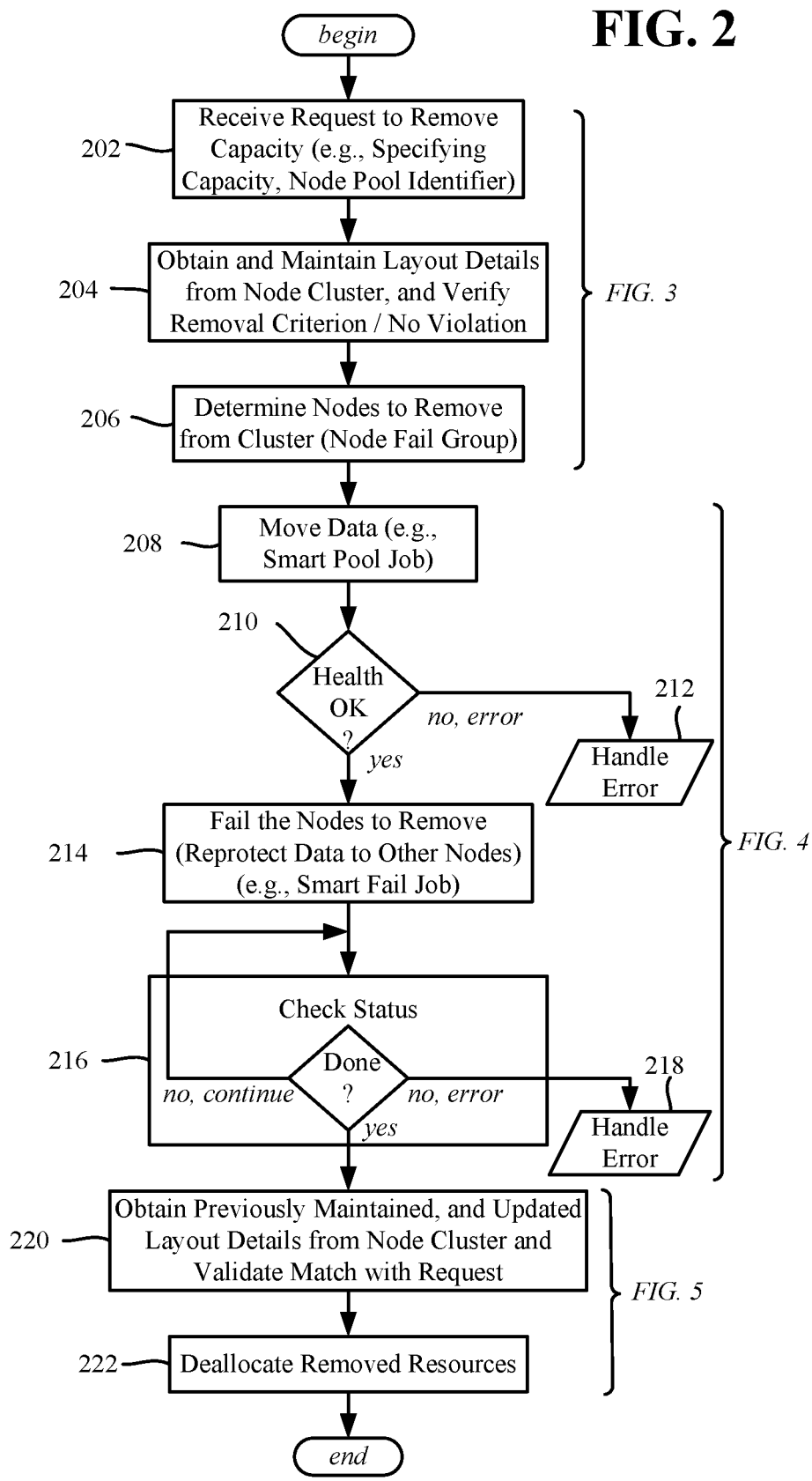
FIG. 2 is a flow diagram showing example operations related to reducing capacity in a clustered file system, in accordance with various aspects and implementations of the subject disclosure.
Figure 3:
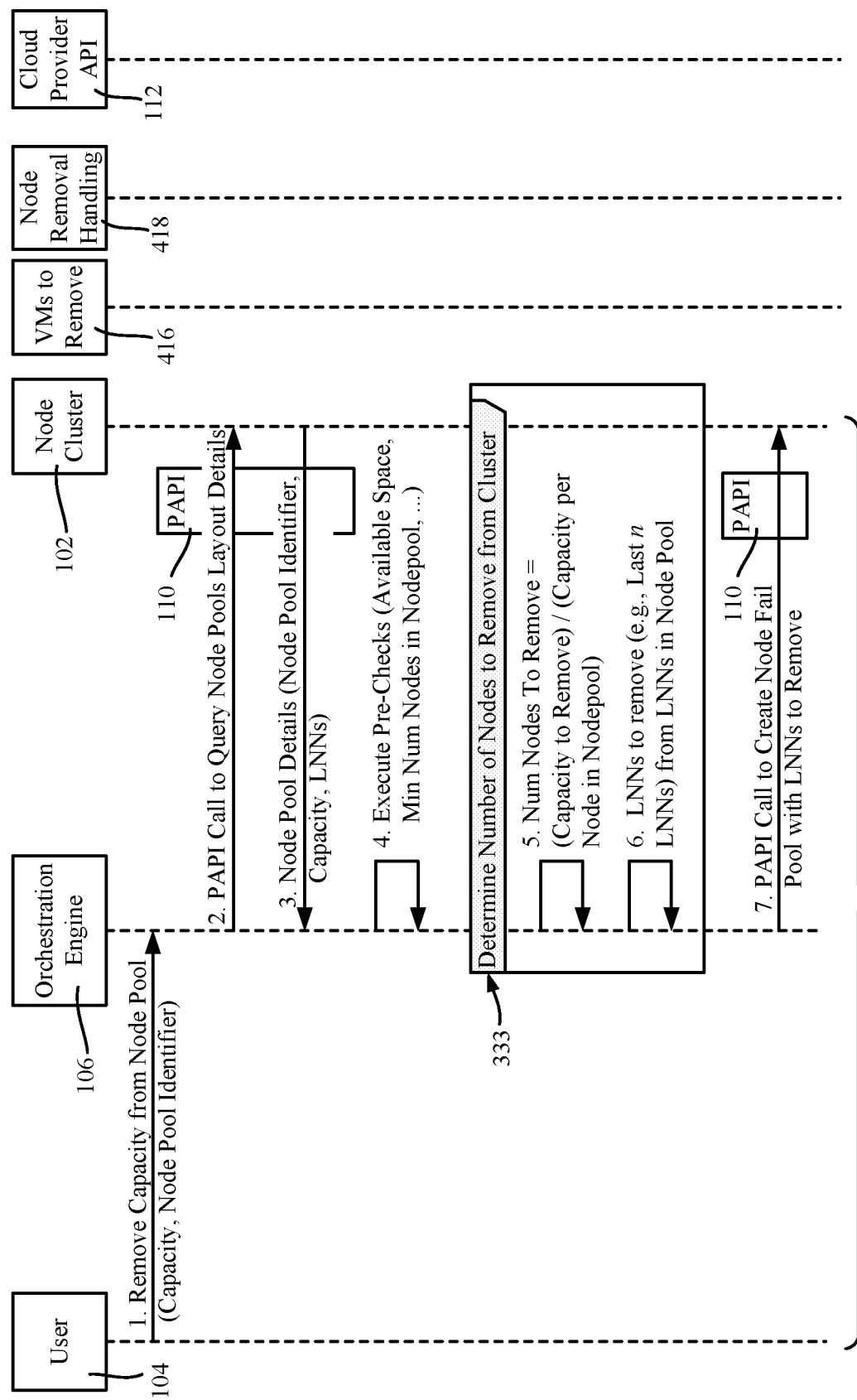
FIGS. 3-5 comprise an example component and signaling diagram showing example dataflow sequences of a workflow related to orchestration of virtual machine removal in a node cluster, in accordance with various aspects and implementations of the subject disclosure.
Figure 4:
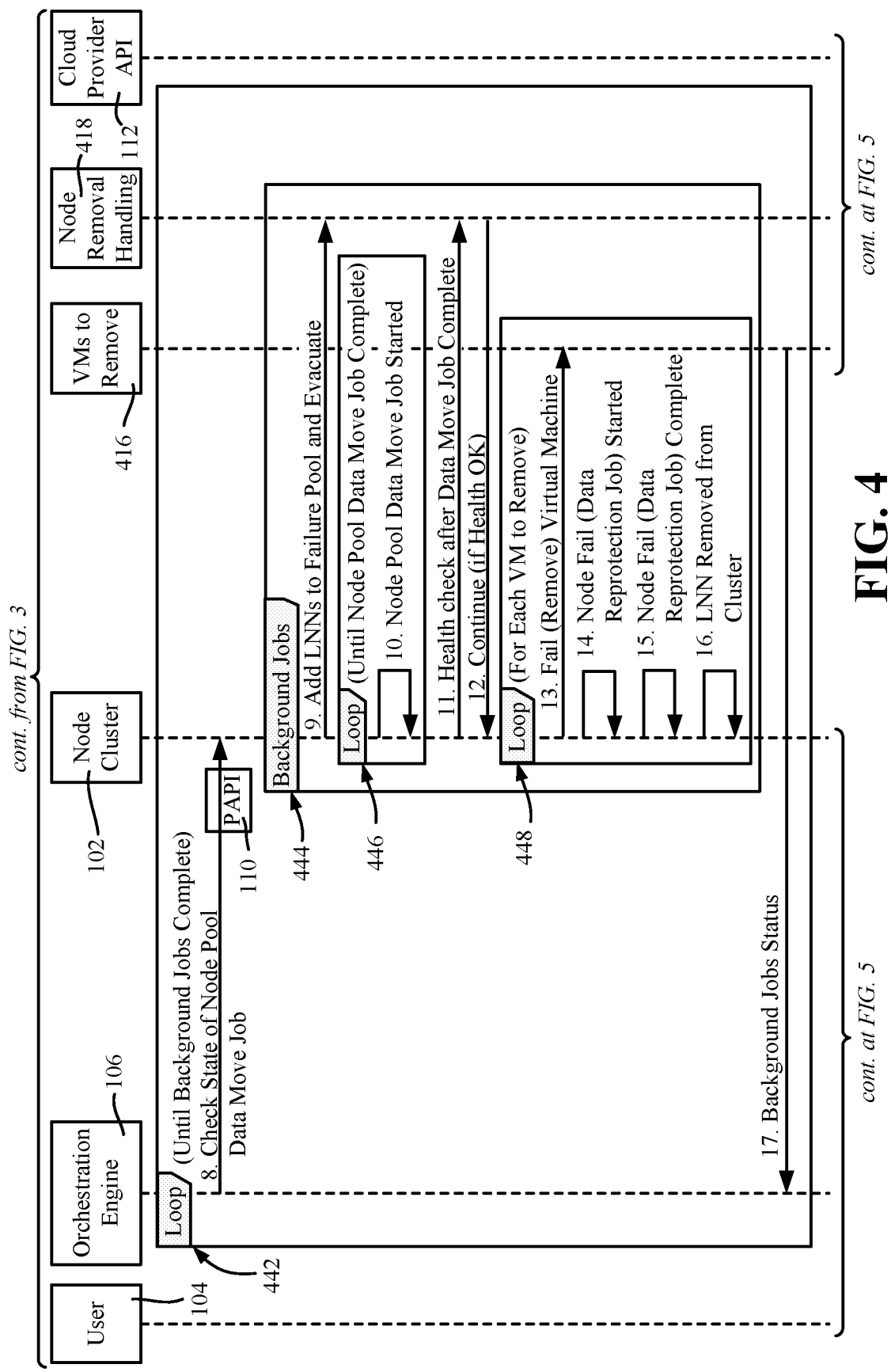
Figure 5:
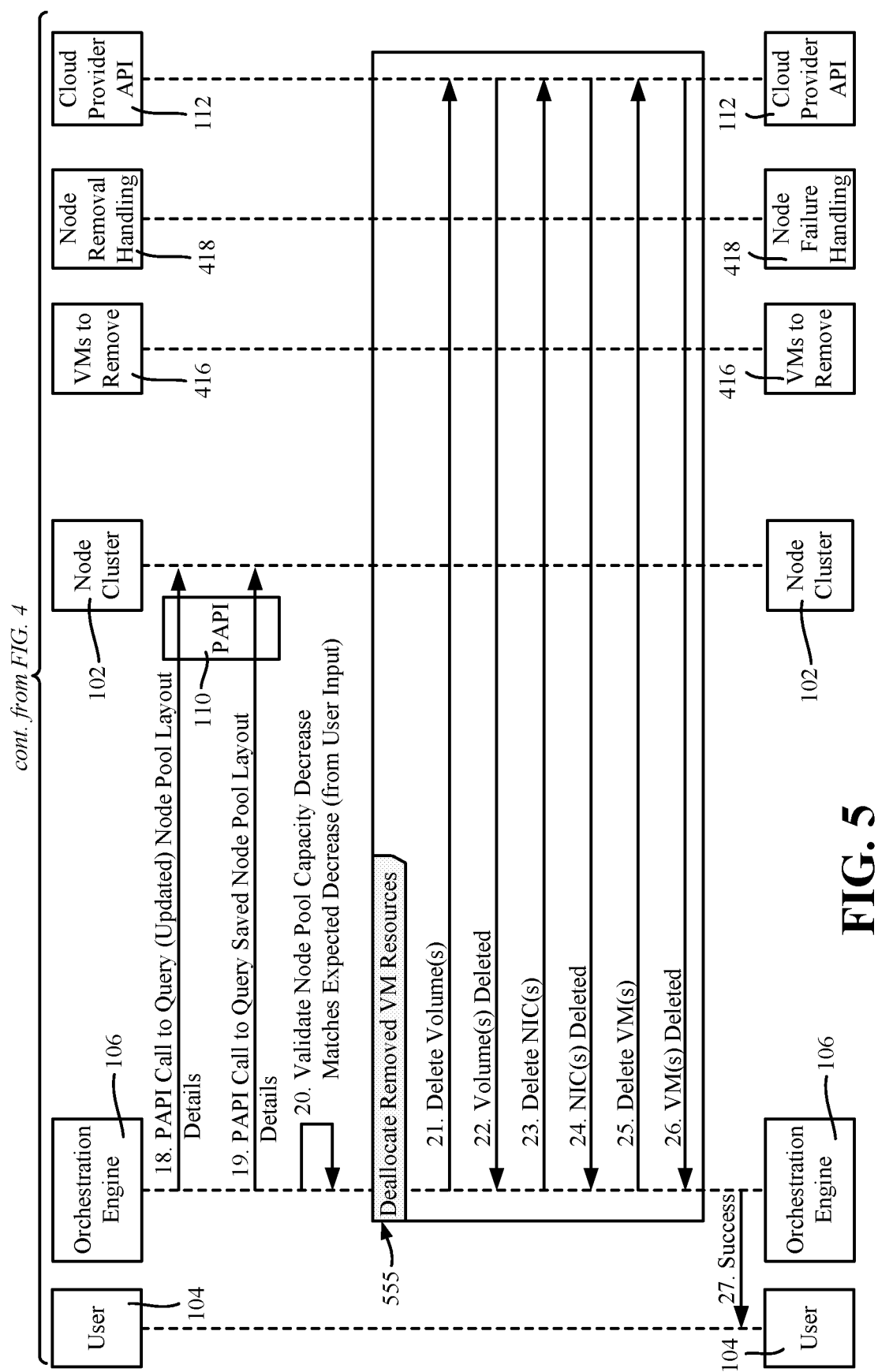

Once the user input is provided, the orchestration engine 106, which includes node removal logic 108 (e.g., that can perform various validation checks), starts a workflow as described in the example flow diagram of FIG. 2 and the example component/signaling/dataflow sequence diagram of FIGS. 3-5; note that these figures are only examples, and other or alternative operations may be performed, and/or in a different order from that depicted. Receiving of user input at the orchestration engine 106 is represented via operation 202 of FIG. 2 and labeled arrow one (1) of FIG. 3.

As shown in FIG. 1, in one implementation the orchestration engine 106 interfaces with the node cluster through a platform API (PAPI) 110 and with the cloud environment 100 in general through a cloud provider API 112. As described herein, as part of the workflow, based on the user (or process) input, the orchestration engine 106/node removal logic 108 determines (via the input capacity data) how many nodes to remove, and (via the input pool identification data) which group of (one or more) nodes 114 to remove. In one implementation, the nodes to remove correspond to a grouping of one or more logical node numbers (LLNs) 116, e.g., in a "fail pool" (because in this example implementation removal is performed by planned node/virtual machine failure). The group 114 in FIG. 1 shows an example in which three nodes (of the same user-identified, associated pool of nodes) are to be removed from the node cluster 104; in other node pool-based examples this can be a single node up to the entire pool of nodes.

As shown in FIGS. 2 and 3, after receiving the user input, another part of the example workflow is the orchestration engine 106 obtaining and maintaining relevant cluster node pool layout information, which will be used for pre-validation and post-validation operations as described herein. Nonlimiting examples of such relevant information for a specified pool of nodes can include the raw capacity, available capacity, capacity per node, and LNNs of the nodes in the pool. This is generally shown via example operation 204 of FIG. 2 and labeled arrows two (2) and three (3) of FIG. 3.

With the returned layout information maintained, the orchestration engine 106 executes a set of pre-checks to determine if the process can proceed based on various removal criteria (e.g., free space sufficiency and node pool constraints). In this example, the pre-checks include capacity checks (e.g., the capacity requested to be removed is not larger than available free space) and the number of nodes to remove does not leave an unsupported number of nodes in the pool of nodes (e.g., less than three nodes in a node pool can leave them unprovisioned). The unsupported number of nodes check does not apply if the user decides to remove the entire node pool. This is represented via part of example operation 204 of FIG. 2 and labeled arrow four (4) of FIG. 3. Note that in this example the pre-checks allow the node removal to proceed; (although not explicitly depicted in FIGS. 2 and 3, if any pre-check fails, the orchestration engine 106 returns an error back to the user 104, which may include a reason for the failure and/or a recommendation as to how to proceed, and the workflow ends).

If (as in this example) the pre-checks pass, the orchestration engine 106 can start the capacity removal. Using the capacity provided, the orchestration engine 106 determines which node or nodes (by their LNNs) to remove. To this end, by taking the capacity to remove and dividing by the capacity per node in the pool of nodes, the orchestration engine 106 (e.g., via the node removal logic 108) determines how many nodes need to be removed. Because in this example implementation the orchestration engine 106 needs to provide one or more LNNs to create the node fail pool 116 (FIG. 1), in one alternative the orchestration engine 106 selects the last n LNNs in the LNN ordered list based on the n number of nodes to be removed. In alternative implementations, selection of the n nodes to remove can be based on other factors or combinations thereof, e.g., the oldest nodes, the nodes with least usage, the nodes with the most free space, random selection, and so on. If the user chooses to remove an entire pool of nodes, the orchestration engine 106 passes in all of the LNNs in the pool of nodes. The number of node(s) to remove and selection operations are generally shown via operation 206 of FIG. 2 and block 333 (labeled arrows five (5) and six (6) of FIG. 3.

With the list of LNNs to remove, the orchestration engine 106 makes the appropriate PAPI call to the node cluster to create the failure pool (e.g., in a DELL PowerScale® system). The labeled arrow seven (7) shows such a call for creation of the node fail pool 116 (FIG. 1) in the node cluster 102; FIG. 3 continues at FIG. 4, which represents running a number of background jobs until complete.

In the example of FIG. 4, the labeled arrow eight (8) represents looping (block 442) to check the status of the background jobs (block 444), which continues in this example until the background jobs status is complete (labeled arrow seventeen (17)). The background jobs (block 444) described herein provide the ability to remove from one node to more than half of the nodes in the cluster. The end-result (ordinarily) leaves the system in a valid configuration with the desired capacity/number of nodes removed from the node cluster.

Creating the fail pool results in a number of background jobs (block 444 of FIG. 4) being run, which ensures that each set (pool) of storage devices (e.g., disks) of the LNNs to remove are added to the fail pool and marked for removal. Node removal can be performed by system-controlled failure operations, e.g., nodes are marked as "evacuate" or the like (labeled arrow nine (9) in FIG. 4) as part of the background jobs (block 444). In the background jobs, in one implementation this triggers a data move job (loop block 446, arrow ten (10), e.g., SmartPool in PowerScale®) that ensures that any writes to these storage units are written elsewhere, and that every object in the filesystem is checked and rewritten on other nodes (the data move) if necessary. This is also represented by operation 208 of FIG. 2. Among the benefits of the data move operation, as much data as possible is moved in a safe manner before any node is failed to remove that node; subsequent removal by planned node failure has a slight risk if an actual hardware failure occurs during the failure operation. Further, a data move job such as SmartPool can rebalance the data among the remaining nodes, which is also beneficial to the node cluster operation.

Arrow eleven (11) represents a health check of the node cluster following the data move job. The workflow continues (arrow twelve (12), and also represented as operation 210 of FIG. 2) if the health check result is OK, (otherwise a suitable notification or the like is returned to the user via operation 212, possibly with a recovery operation to roll back any changes). In this example, the node cluster's health is OK and the example workflow continues.

Block 448 of FIG. 4 and operation 214 of FIG. 2 represents a next loop within the background jobs that separately removes each of nodes via a planned failure; in this example the virtual machines of the node are failed, one at a time, which in one implementation map to nodes; (although alternative implementations can fail nodes). More particularly, once the data move job (loop block 446) completes, each node to be removed is failed in a way that re-protects the data among the remaining nodes of the cluster, e.g., via a "FlexProtect" job. Arrow thirteen (13) fails a VM/node (blocks 416 and 418), which re-protects the data among remaining nodes in the node cluster (arrows fourteen (14) and fifteen (15)); once complete for a node, the LNN for that node is removed from being part of the node cluster (arrow sixteen (16)). The failure process is repeated for each other node to remove. If there is an error with respect to removing a node, operations 216 and 218 handle the failure. In this example the node removal process continues successfully for each node until complete.

When complete, the orchestration engine 106 is notified of the background jobs status being complete, (arrow sixteen (16)), as described herein. The workflow continues at FIG. 5.

As represented in FIG. 2 via operation 220, with the background jobs including node removal complete, the orchestration engine 106 runs post-validation steps. To do so, the orchestration engine 106 gathers via the updated version of the same information as when the workflow was started. Thus, arrow eighteen (18) obtains the updated node pool layout details, and arrow nineteen (19) obtains the set of layout details prior to the node removal (previously maintained via operation 204). From here, the orchestration engine 106 validates (arrow twenty (20)) whether the new raw capacity for the given pool of nodes matches what was expected to be removed. If an entire node pool was removed, the orchestration engine 106 ordinarily no longer sees this node pool. In this example, validation determines that the node removal (or node pool removal) was correctly performed; (if not, an error can be returned, the workflow can be rerun with changes that address the issue, and so on).

Once the orchestration engine 106 has validated that the shrinking of the cluster was successful, the orchestration engine 106 cleans up (block 555, arrows twenty-one (21) through twenty-six (26) of FIG. 5) the cloud infrastructure resources tied to the now-removed nodes (e.g., one or more VMs, network interface controllers (NICs), and Volumes). This is also represented via operation 222 of FIG. 2. Note that in this example, this is accomplished via appropriate calls to the cloud environment(s) using the cloud provider API 112 of FIG. 1. Arrow twenty-seven (27) returns a "success" indication from the orchestration engine 106 to the user 104 in this example.

With the orchestration technology set forth herein, the overall system takes away the errors that can occur during manual attempts to reduce node cluster capacity. In some cluster systems (e.g., PowerScale®), the orchestration technology described herein can leverage existing features (e.g., including SmartPool and FlexProtect), while other systems can perform similar operations to properly remove nodes, coordinate pre- and post-validation steps, and handle the removal of cloud resources. This provides users with a valuable capability, including to save costs without performing manual error prone procedures, and also gives users flexibility around how they manage their deployments, providing a significant benefit when operating in the cloud.

It should be noted that the technology described herein not only avoids manual, complex and error-prone steps to remove nodes from a cluster, the technology described herein is significantly more than simply automating such complex steps. For example, the technology described herein allows for single node removal, which is a different outcome than would result from existing documented manual steps. In addition, pre- and post-validation ensure correct cluster node operation.

Figure 6:
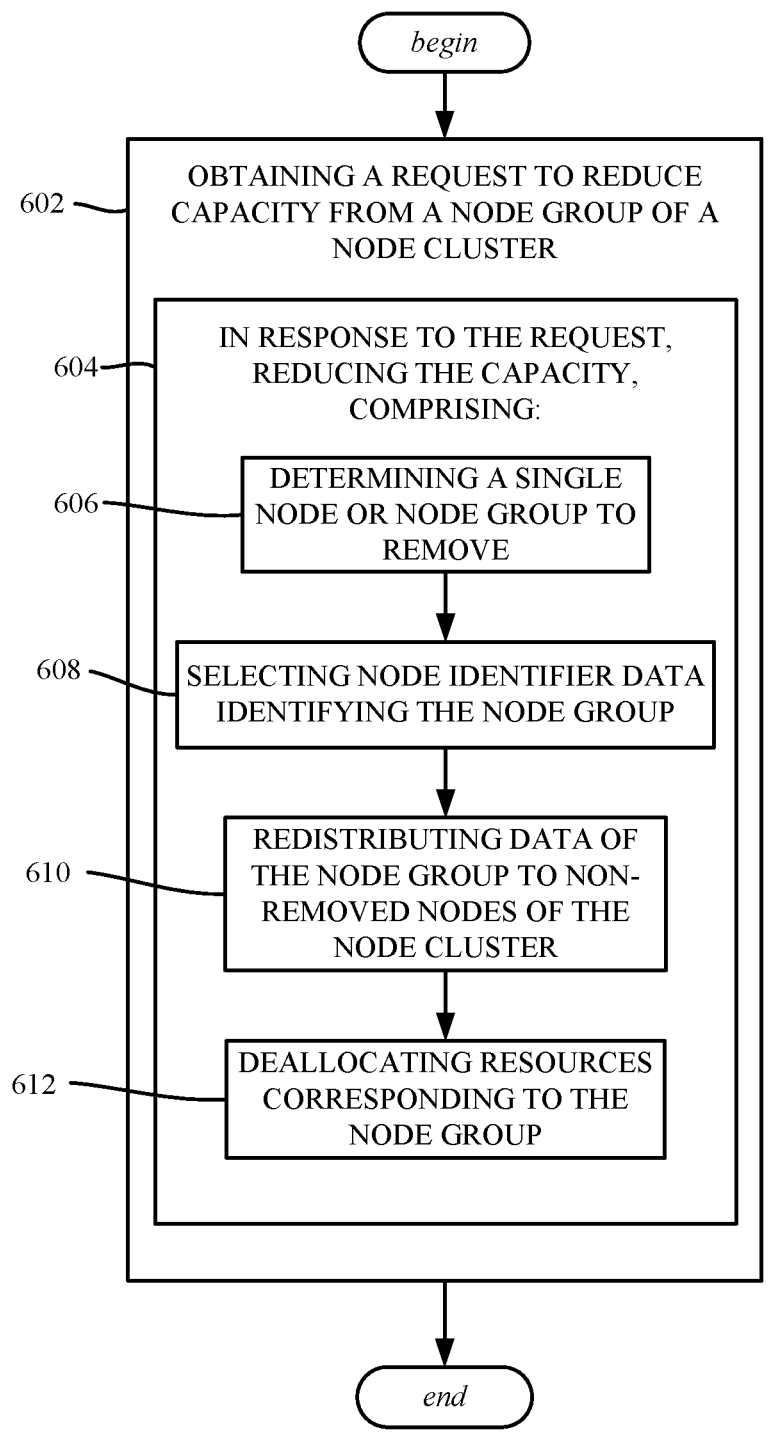
FIG. 6 is a flow diagram showing example operations related to reducing capacity of a node group (one or more nodes) of a node cluster via automated operations, in accordance with various aspects and implementations of the subject disclosure.

One or more aspects can be embodied in a system, such as represented in the example operations of FIG. 6, and for example can include a memory that stores computer executable components and/or operations, and a processor that executes computer executable components and/or operations stored in the memory. Example operations can include operation 602, which represents obtaining a request to reduce capacity from a node group of a node cluster. Operation 604 represents, in response to the request, reducing the capacity, which can include determining a node group (which can be a single node) to remove (operation 606), selecting node identifier data identifying the node group (operation 608), redistributing data of the node group to non-removed nodes of the node cluster (operation 610), and deallocating resources corresponding to the node group (operation 612).

Selecting the node identifier data can include selecting at least one respective logical node number representing a respective node in the node group.

Further operations can include selecting the node group from the node cluster based on respective values of respective logical node numbers representing respective nodes in the node cluster.

Redistributing the data of the node group can include invoking a data reprotection operation. The data reprotection operation can protect the data among the non-removed nodes of the node cluster, and can remove the node group from the node cluster. Further operations can include, prior to invoking the data protection operation, invoking a data move operation that moves data from the node group.

The request can be associated with capacity data, and further operations can include verifying, based on the capacity data, that removal of the node group satisfies a removal criterion, and denying the request in response to the removal of the node group not satisfying the removal criterion.

The request can be associated with capacity data, and further operations can include validating that the reducing of the capacity of the node group results in a decrease in capacity that corresponds to the capacity data.

The request can be associated with a pool of associated nodes from which the node group is selected. The node group can include the pool of associated nodes.

The resources can include at least one of: a volume, a virtual network interface card, or a virtual machine.

Figure 7:
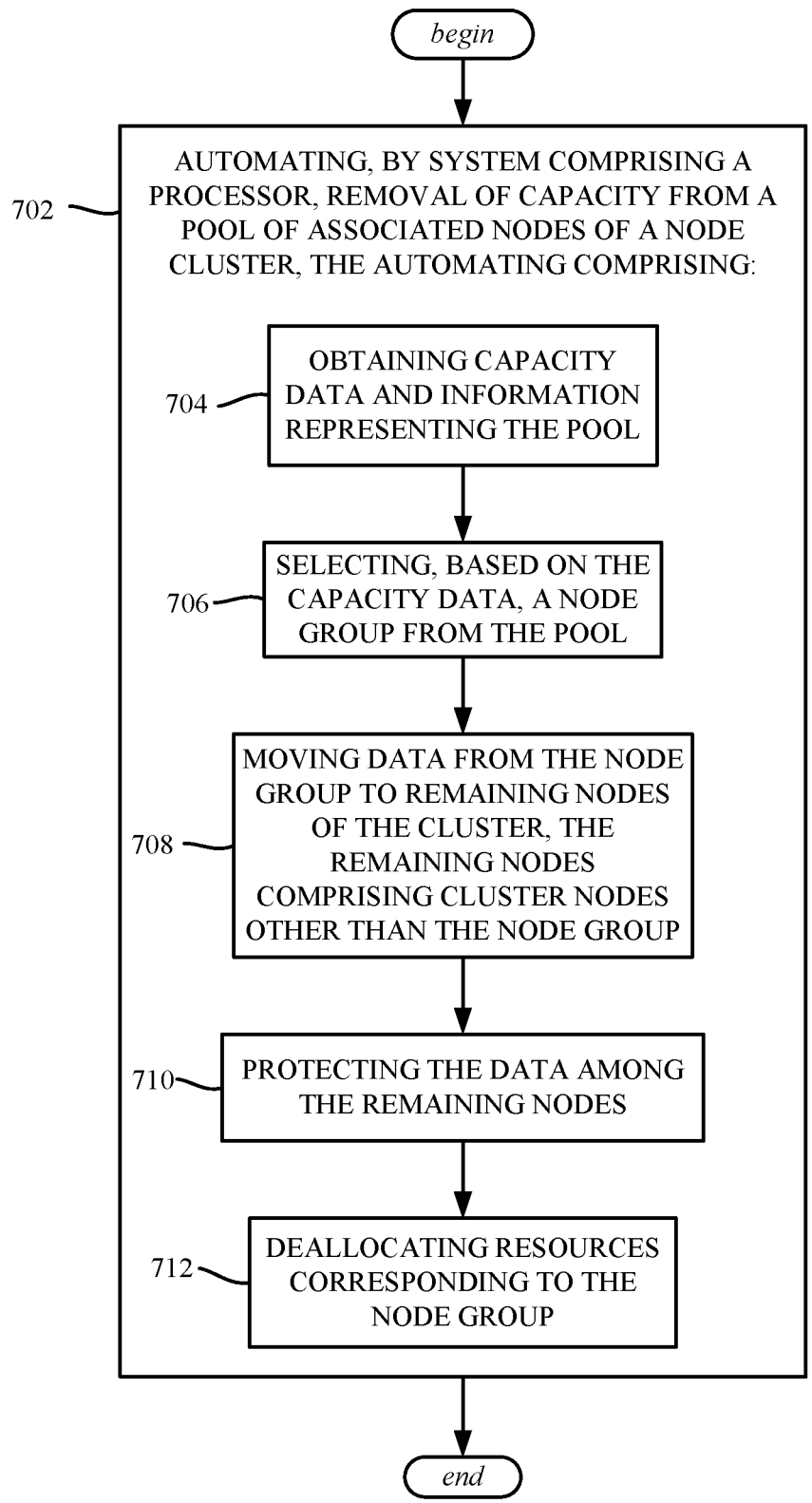
FIG. 7 is a flow diagram showing example operations related to automating reduction of capacity from a pool of associated nodes of a node cluster, in accordance with various aspects and implementations of the subject disclosure.

One or more example aspects, such as corresponding to example operations of a method, are represented in FIG. 7. Example operation 702 represents automating, by system comprising a processor, removal of capacity from a pool of associated nodes of a node cluster. The automating can comprise operations 704-712. Example operation 704 represents obtaining capacity data and information representing the pool. Example operation 706 represents selecting, based on the capacity data, a node group from the pool. Example operation 708 represents moving data from the node group to remaining nodes of the cluster, the remaining nodes comprising cluster nodes other than the node group. Example operation 710 represents protecting the data among the remaining nodes. Example operation 712 represents deallocating resources corresponding to the node group.

Selecting the node group can include determining a number of nodes to remove based on the capacity data and the capacity per node of the pool of associated nodes.

The automating further can include verifying, based on the capacity data, that sufficient free space exists, according to a sufficiency criterion, among the remaining nodes to remove the capacity without data loss.

Automating further can include verifying, based on the information representing the pool, that removal of the node group does not violate node pool criterion data.

The data of the node group can be maintained by virtual machines of the node group, and protecting the data among the remaining nodes can include invoking fail operations that re-protect data of virtual machines of the node group among the remaining nodes, and remove node identifier data of the node group.

Deallocating the resources can include deallocating at least one of: a volume, a virtual network interface card, or a virtual machine.

Figure 8:
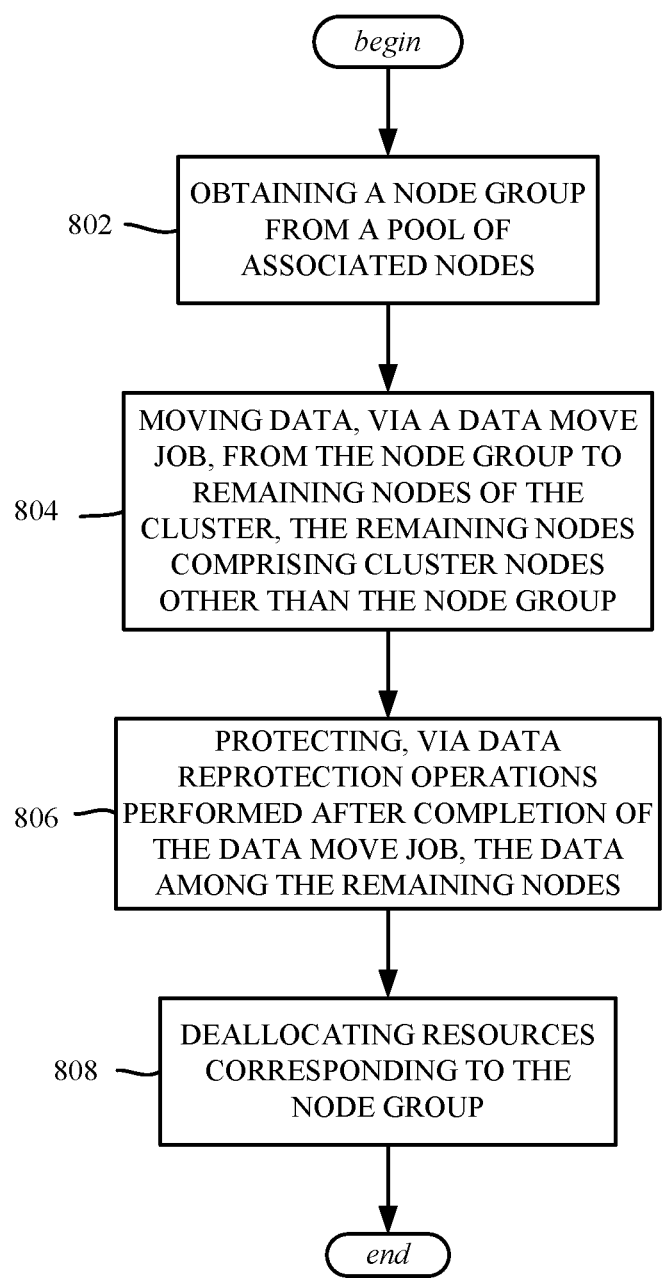
FIG. 8 is a flow diagram showing example operations related to various automated cluster capacity reduction operations, in accordance with various aspects and implementations of the subject disclosure.

FIG. 8 summarizes various example operations, e.g., corresponding to a machine-readable medium, comprising executable instructions that, when executed by a processor, facilitate performance of operations. Example operation 802 represents obtaining a node group from a pool of associated nodes. Example operation 804 represents moving data, via a data move job, from the node group to remaining nodes of the cluster, the remaining nodes comprising cluster nodes other than the node group. Example operation 806 represents protecting, via data reprotection operations performed after completion of the data move job, the data among the remaining nodes. Example operation 808 represents deallocating resources corresponding to the node group.

Protecting the data and removing of the node group can include invoking a fail job that removes node identifier data of the node group of the node group after re-protecting the data of the virtual machines among the remaining nodes.

Deallocating the resources can include deallocating at least one of: a volume, a virtual network interface card, or a virtual machine.

As can be seen, the technology described herein facilitates tearing down infrastructure in the cloud for cost benefits, which is expected to be a common operation. In automating the reduction of capacity for a cluster, support personnel is not needed to drive an error prone process, allowing customers to leverage resources in a more flexible manner that is cost efficient, and provide a seamless user experience. Thus, the capacity reduction technology described herein provides a highly valuable business function for customers' virtualized clustered filesystems in the cloud. The described orchestration overcomes current inadequate procedures provided by Cloud Provider APIs; for example simply tearing down VMs does not satisfy the operations need by a PowerScale® filesystem. As a more particular example, using cloud methods to remove resources from a cluster would leave the node(s) as down, and an additional step would be taken to perform the node failure actions; this would also necessitate that the end-user know the mapping between respective nodes in a node pool to the respective VMs to fail through cloud provider APIs.

Figure 9:
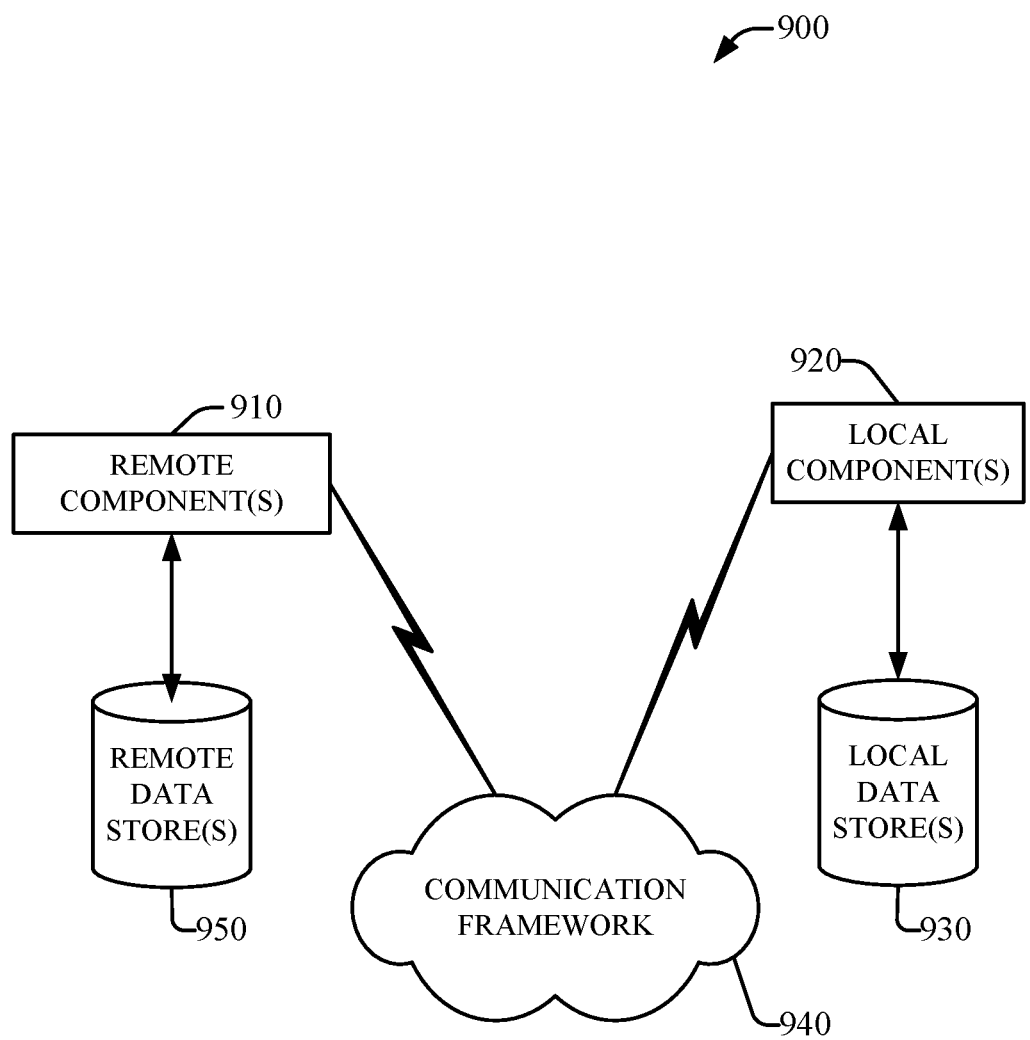
FIG. 9 is a block diagram representing an example computing environment into which aspects of the subject matter described herein may be incorporated.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The system 900 also comprises one or more local component(s) 920. The local component(s) 920 can be hardware and/or software (e.g., threads, processes, computing devices). In some embodiments, local component(s) 920 can comprise an automatic scaling component and/or programs that communicate/use the remote resources 910, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a Universal Mobile Telecommunications System (UMTS) network, via a long-term evolution (LTE) network, etc. Remote component(s) 910 can be operably connected to one or more remote data store(s) 950, such as a hard drive, solid state drive, Subscriber Identity Module (SIM) card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
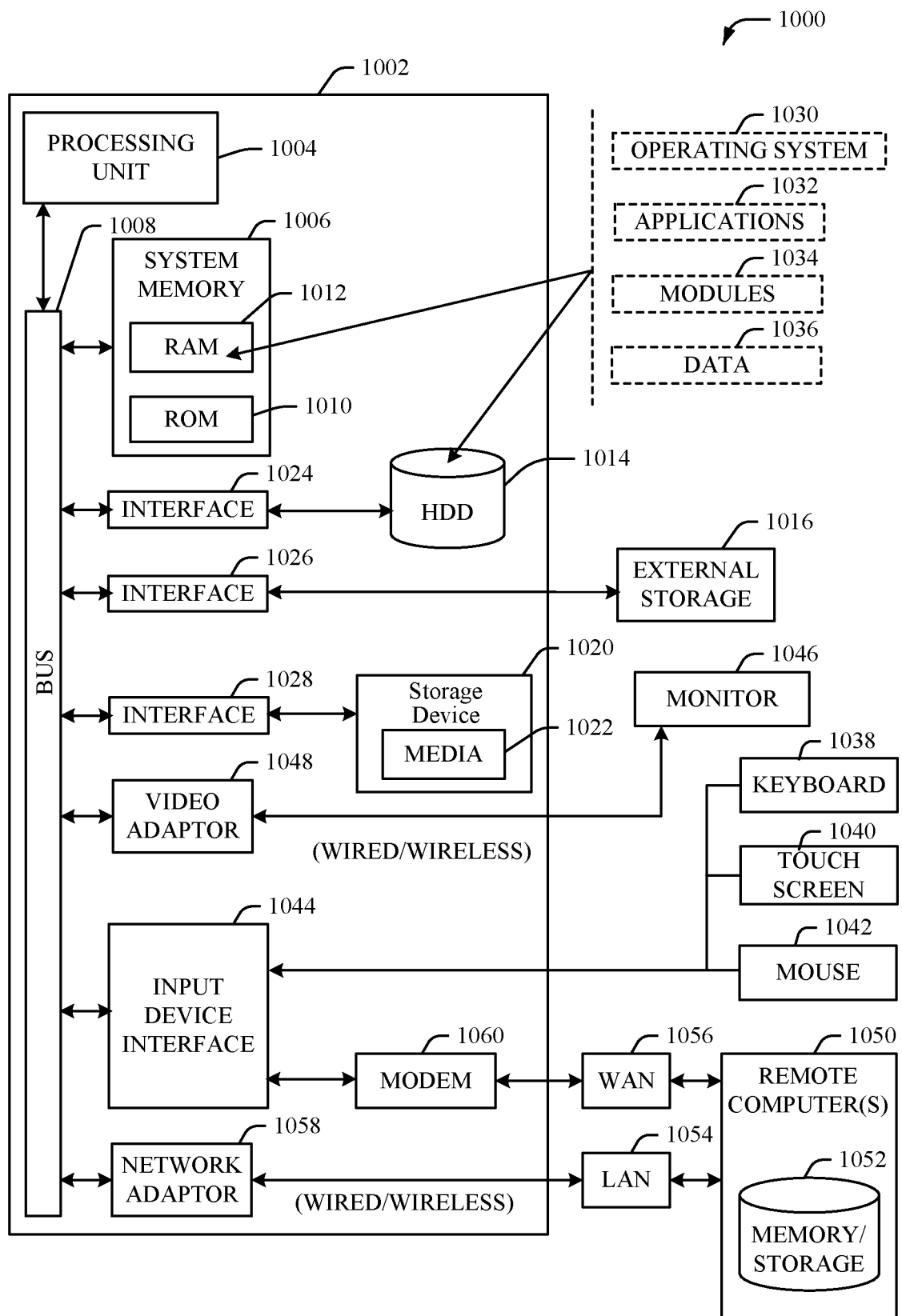
FIG. 10 depicts an example schematic block diagram of a computing environment with which the disclosed subject matter can interact/be implemented at least in part, in accordance with various aspects and implementations of the subject disclosure.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per sc.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., Enhanced Integrated Drive Electronics (EIDE), Serial Advanced Technology Attachment (SATA)), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (virtual machine) of multiple virtual machines hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an Institute of Electrical and Electronics Engineers (IEEE) 1094 serial port, a game port, a Universal Serial Bus (USB) port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
   at least one processor; and
   at least one memory that stores executable instructions that, when executed by the at least one processor, facilitate performance of operations, the operations comprising:
   receiving a user request to adjust a node group of node groups of a data protected storage node cluster, wherein the node group comprises a pool of nodes of the data protected storage node cluster that have a same configuration, and wherein the user request specifies a node identifier of the node group, and an amount of storage space to remove from a total amount of raw storage space distributed across the pool of nodes of the node group; and
   in response to the user request, adjusting the node group, comprising:
   determining, based on the amount of storage space to remove and raw storage space per node of the node group, a quantity of nodes from the node group to remove;
   determining whether removing the quantity of nodes leaves an unsupported quantity of nodes in the node group for protection of data in the node group in response to failure of a node in the node group;
   in response to determining that removing the quantity of nodes does not leave the unsupported quantity of nodes in the node group, selecting, based on a defined criterion, one or more nodes to remove from the node group equal to the quantity of nodes, the selecting resulting in one or more selected nodes, and resulting in one or more other nodes of the node group other than the one or more selected nodes being one or more non-selected nodes;

redistributing data of the one or more selected nodes of the node group to the one or more non-selected nodes of the data protected storage node cluster, wherein the redistributing data of the one or more selected nodes, comprises:
    for each virtual machine, of the data protected storage node cluster, associated with the one or more selected nodes:
        initiating a fail operation for the virtual machine, and
        removing, from the data protected storage node cluster, logical node numbers corresponding to nodes associated with the virtual machine;
        moving data stored on the one or more selected nodes to at least one of the one or more non-selected nodes, and
        redirecting data write operations to the one or more selected nodes to the at least one of the one or more non-selected nodes; and
    deallocating resources corresponding to the one or more selected nodes of the node group.

2. The system of claim 1, wherein the selecting of the one or more nodes comprises selecting respective logical node numbers representing one or more selected nodes.

3. The system of claim 1, wherein the defined criterion comprises a criterion that causes selection of one or more oldest nodes of the node group.

4. The system of claim 1, wherein the redistributing of the data of the one or more selected nodes of the node group comprises invoking, one at a time, respective failures of the one or more selected nodes.

5. The system of claim 1, wherein the defined criterion comprises a criterion that causes selection of one or more least used nodes of the node group.

6. The system of claim 1, wherein the operations further comprise:
    verifying, based on the amount of capacity to remove, that a remaining capacity of the node group satisfies a removal criterion; and
    denying the user request in response to the remaining capacity of the node group not satisfying the removal criterion.

7. The system of claim 1, wherein the defined criterion comprises a criterion that causes selection of one or more nodes of the node group having a greatest amount of free space.

8. The system of claim 1, wherein the resources comprise at least one of: a volume, a virtual network interface card, or a virtual machine.

9. A method, comprising:
    receiving, by a system comprising at least one processor, a user request to adjust a node group of multiple node groups of a data protected storage node cluster, wherein the node group comprises a pool of nodes of the data protected storage node cluster that have a same configuration, and wherein the user request specifies a node identifier of the node group, and an amount of storage space to remove from a total amount of raw storage space distributed across the pool of nodes of the node group; and
    in response to the user request, adjusting, by the system, the node group, comprising:
        determining, based on the amount of storage space to remove and raw storage space per node of the node group, a quantity of nodes from the node group to remove;
        determining whether removing the quantity of nodes is threshold likely to result in an unsupported quantity of nodes in the node group for protection of data in the node group in response to failure of a node in the node group;
        in response to determining that removing the quantity of nodes is not threshold likely to result in the unsupported quantity of nodes in the node group, selecting, based on a defined criterion, one or more nodes to remove from the node group equal to the quantity of nodes, resulting in one or more selected nodes, and further resulting in non-selected nodes that were not selected by the selecting;
        redistributing data of the one or more selected nodes of the node group to one or more of the non-selected nodes of the data protected storage node cluster, wherein the redistributing data of the one or more selected nodes, comprises:
            for each virtual machine, of the data protected storage node cluster, associated with the one or more selected nodes:
                initiating a fail operation for the virtual machine, and
                removing, from the data protected storage node cluster, logical node numbers corresponding to nodes associated with the virtual machine;
            moving data stored on the one or more selected nodes to the one or more of the non-selected nodes, and
            redirecting data write operations to the one or more selected nodes to the one or more of the non-selected nodes; and
        deallocating resources corresponding to the one or more selected nodes of the node group.

10. The method of claim 9, wherein the defined criterion is applicable to select one or more oldest nodes of the node group.

11. The method of claim 9, wherein the redistributing of the data of the one or more selected nodes of the node group comprises invoking, one at a time, respective failures of the one or more selected nodes.

12. The method of claim 9, wherein the defined criterion is applicable to select one or more least used nodes of the node group.

13. The method of claim 9, wherein the defined criterion is applicable to select one or more nodes of the node group having most free space.

14. The method of claim 9, further comprising:
    based on the amount of capacity to remove, verifying, by the system, that a remaining capacity of the node group satisfies a removal criterion; and
    denying, by the system, the user request in response to the remaining capacity of the node group being determined not to satisfy the removal criterion.

15. A non-transitory computer-readable medium having instructions stored thereon that, in response to execution, cause a system comprising at least one processor to perform operations comprising:
    receiving a user request to adjust a node group of a plurality of node groups of a data protected storage node cluster, wherein the node group comprises a pool of nodes of the data protected storage node cluster that have a same configuration, and wherein the user request specifies a node identifier of the node group, and an amount of storage space to remove from a total amount of raw storage space distributed across the pool of nodes of the node group; and in response to the user request, adjusting the node group, comprising:
determining, based on the amount of storage space to remove and raw storage space per node of the node group, a quantity of nodes from the node group to remove;
determining whether removing the quantity of nodes will result in an unsupported quantity of nodes in the node group for protection of data in the node group in response to failure of a node in the node group;
in response to determining that removing the quantity of nodes will not result in the unsupported quantity of nodes in the node group, selecting, based on a defined criterion, one or more nodes to remove from the node group equal to the quantity of nodes;
redistributing data of the one or more nodes of the node group to non-selected nodes of the data protected storage node cluster that were not selected by the selecting, wherein the redistributing data of the one or more nodes, comprises:
for each virtual machine, of the data protected storage node cluster, associated with the one or more selected nodes:
initiating a fail operation for the virtual machine, and
removing, from the data protected storage node cluster, logical node numbers corresponding to nodes associated with the virtual machine;
moving data stored on the one or more nodes to one or more of the non-selected nodes, and
redirecting data write operations to the one or more nodes to the one or more of the non-selected nodes; and
deallocating resources corresponding to the one or more nodes of the node group.

16. The non-transitory computer-readable medium of claim 15, wherein using the defined criterion comprises selecting one or more oldest nodes of the node group.

17. The non-transitory computer-readable medium of claim 15, wherein the redistributing of the data of the one or more nodes of the node group comprises invoking, one at a time, respective failures of the one or more nodes.

18. The non-transitory computer-readable medium of claim 15, wherein using the defined criterion comprises selecting one or more least used nodes of the node group.

19. The non-transitory computer-readable medium of claim 15, wherein the operations further comprise:
verifying, based on the amount of capacity to remove, that a remaining capacity of the node group satisfies a removal criterion; and
denying the user request in response to the remaining capacity of the node group not satisfying the removal criterion.

20. The non-transitory computer-readable medium of claim 15, wherein using the defined criterion comprises selecting one or more nodes of the node group having most free space.

* * * * *